United States Patent
Seth et al.

(10) Patent No.: US 11,681,689 B2
(45) Date of Patent: Jun. 20, 2023

(54) AUTOMATIC GENERATION OF A MATCHING ALGORITHM IN MASTER DATA MANAGEMENT

(71) Applicant: International Business Machines Corporation, Armonk, NY (US)

(72) Inventors: Abhishek Seth, Deoband (IN); Soma Shekar Naganna, Bangalore (IN); James Albert O'Neill, Jr., Austin, TX (US); Geetha Sravanthi Pulipaty, Bangalore (IN); Neeraj Ramkrishna Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 17/342,895

(22) Filed: Jun. 9, 2021

(65) Prior Publication Data

US 2022/0398241 A1    Dec. 15, 2022

(51) Int. Cl.
*G06F 16/23* (2019.01)
*G06F 16/22* (2019.01)

(52) U.S. Cl.
CPC ...... *G06F 16/2379* (2019.01); *G06F 16/2255* (2019.01); *G06F 16/2272* (2019.01)

(58) Field of Classification Search
CPC ............. G06F 16/2379; G06F 16/2272; G06F 16/2255
See application file for complete search history.

(56) References Cited

U.S. PATENT DOCUMENTS

| | | | |
|---|---|---|---|
| 2016/0063052 A1* | 3/2016 | Natarajan | G06F 16/2365 707/691 |
| 2019/0005242 A1* | 1/2019 | Agarwal | G06F 21/566 |
| 2019/0138632 A1* | 5/2019 | Fry | G06F 16/2379 |
| 2019/0171632 A1* | 6/2019 | Gupta | G06F 16/24542 |
| 2020/0134483 A1 | 4/2020 | Bremer | |
| 2020/0320153 A1 | 10/2020 | Luz Xavier Da Costa | |
| 2021/0349884 A1* | 11/2021 | Aaron | G06F 40/40 |
| 2022/0027347 A1* | 1/2022 | Kruempelmann | G06F 16/245 |
| 2022/0237176 A1* | 7/2022 | Khan | G06F 16/2379 |
| 2022/0350792 A1* | 11/2022 | Liu | G06F 16/2468 |

OTHER PUBLICATIONS

"Enrich and Match with Unstructured Data", An IP.com Prior Art Database Technical Disclosure, Authors et al.: Disclosed Anonymously, IP.com No. IPCOM000264411D, IP.com Electronic Publication Date: Dec. 11, 2020, 5 pages.

Ganesan et al., "Link Prediction using Graph Neural Networks for Master Data Management", arXiv:2003.04732v2 [cs.SI] Aug. 28, 2020, 10 pages.

* cited by examiner

Primary Examiner — Huawen A Peng
(74) Attorney, Agent, or Firm — David B. Woycechowsky

(57) ABSTRACT

A method for receiving an additional dataset including a plurality of additional data records; determining a record type using classifiers and an internal domain knowledge corpus; dividing the plurality of additional data records into a plurality of indexing groups; assigning the given additional data record to a match set based on completeness and similarity of natures of attributes of the given additional data record; and assigning the given additional data record to and a comparison group based on completeness and similarity of natures of attributes of the given additional data record.

12 Claims, 7 Drawing Sheets

AUTOMATIC GENERATION OF A MATCHING ALGORITHM IN MASTER DATA MANAGEMENT

BACKGROUND

The present invention relates to master data management computer systems (that is, any computer system that can perform master data management) and more particularly to matching algorithms used to determine when two sets of data are the same, or overlapping, so that the data can be effectively aggregated and centralized.

The Wikipedia entry for "Master Data Management" (as of Mar. 3, 2021) states as follows: "Master data management ('MDM') is a technology-enabled discipline in which business and Information Technology ('IT') work together to ensure the uniformity, accuracy, stewardship, semantic consistency and accountability of the enterprise's official shared master data assets. Drivers for master data management[.] Organisations, or groups of organisations, may establish the need for master data management when they hold more than one copy of data about a business entity. Holding more than one copy of this master data inherently means that there is an inefficiency in maintaining a 'single version of the truth' across all copies. Unless people, processes and technology are in place to ensure that the data values are kept aligned across all copies, it is almost inevitable that different versions of information about a business entity will be held. This causes inefficiencies in operational data use, and hinders the ability of organisations to report and analyse. At a basic level, master data management seeks to ensure that an organization does not use multiple (potentially inconsistent) versions of the same master data in different parts of its operations, which can occur in large organizations. Other problems include (for example) issues with the quality of data, consistent classification and identification of data, and data-reconciliation issues. Master data management of disparate data systems requires data transformations as the data extracted from the disparate source data system is transformed and loaded into the master data management hub. To synchronize the disparate source master data, the managed master data extracted from the master data management hub is again transformed and loaded into the disparate source data system as the master data is updated. As with other Extract, Transform, Load-based data movement, these processes are expensive and inefficient to develop and to maintain which greatly reduces the return on investment for the master data management product." (footnote(s) omitted)

MDM computer systems use "matching algorithms" so that the machine logic of the matching algorithm can determine when two sets of data are the same, or overlapping, so that the data can be effectively aggregated and centralized. As a simple example of this, assume database A has data records, for a group of people, with the following fields: (i) name; and (ii) favorite ice cream. Further assume database B has data records, for a group of people, with the following fields: (i) name; and (ii) hat size. If the matching algorithm determines that certain records in database A relate to the same individuals as in database B, then a consolidated database C can be created, where each record includes a person's name and their eye color and their hat size. The process of making sure that only one record exists per person (or per other key index), so that database C only has one record for individuals listed in both source database A and source database B is called deduplication.

Currently conventional matching algorithms typically include the following computer instruction oriented and/or computer data oriented components: (i) standardization functions; (ii) a definition scheme for entity types (for example, person entity, household entity, organization entity); (iii) bucketing functions used for hash creation during indexing; (iv) a definition of bucket groups based on optimal combinations of different attributes; (v) matching functions; and (vi) matching weights and thresholds (typically initialized with default values and later tuned using information gleaned over time and over the process of using the matching algorithm).

The Wikipedia entry for "Jaccard index" (as of 17 May 2021) states as follows: "The Jaccard index, also known as the Jaccard similarity coefficient, is a statistic used for gauging the similarity and diversity of sample sets . . . . [The Jaccard index uses] the ratio of Intersection over Union. The Jaccard coefficient measures similarity between finite sample sets, and is defined as the size of the intersection divided by the size of the union of the sample sets: [mathematical formula set forth in the original and not repeated here] . . . . The Jaccard coefficient is widely used in computer science, ecology, genomics, and other sciences, where binary or binarized data are used. Both the exact solution and approximation methods are available for hypothesis testing with the Jaccard coefficient. The Jaccard distance, which measures dissimilarity between sample sets, is complementary to the Jaccard coefficient and is obtained by subtracting the Jaccard coefficient from 1, or, equivalently, by dividing the difference of the sizes of the union and the intersection of two sets by the size of the union: [mathematical formula in original and not repeated here]." (footnote(s) omitted)

SUMMARY

According to an aspect of the present invention, there is a method, computer program product and/or system for use in a master data management (MDM) environment that performs the following operations (not necessarily in the following order): (i) receiving an additional dataset including a plurality of additional data records that are to be incorporated into a master dataset that includes a plurality of master data records; (ii) for each given additional data record of the plurality of additional data records, determining, a record type using classifiers and an internal domain knowledge corpus; (iii) dividing the plurality of additional data records into a plurality of indexing groups using the Jaccard coefficient of a plurality of candidate lists; (iv) for each given additional data record of the plurality of additional data records, assigning the given additional data record to a match set based on completeness and similarity of natures of attributes of the given additional data record; and (v) for each given additional data record of the plurality of additional data records, assigning the given additional data record to a comparison group based on completeness and similarity of natures of attributes of the given additional data record.

DETAILED DESCRIPTION

Figure 1:
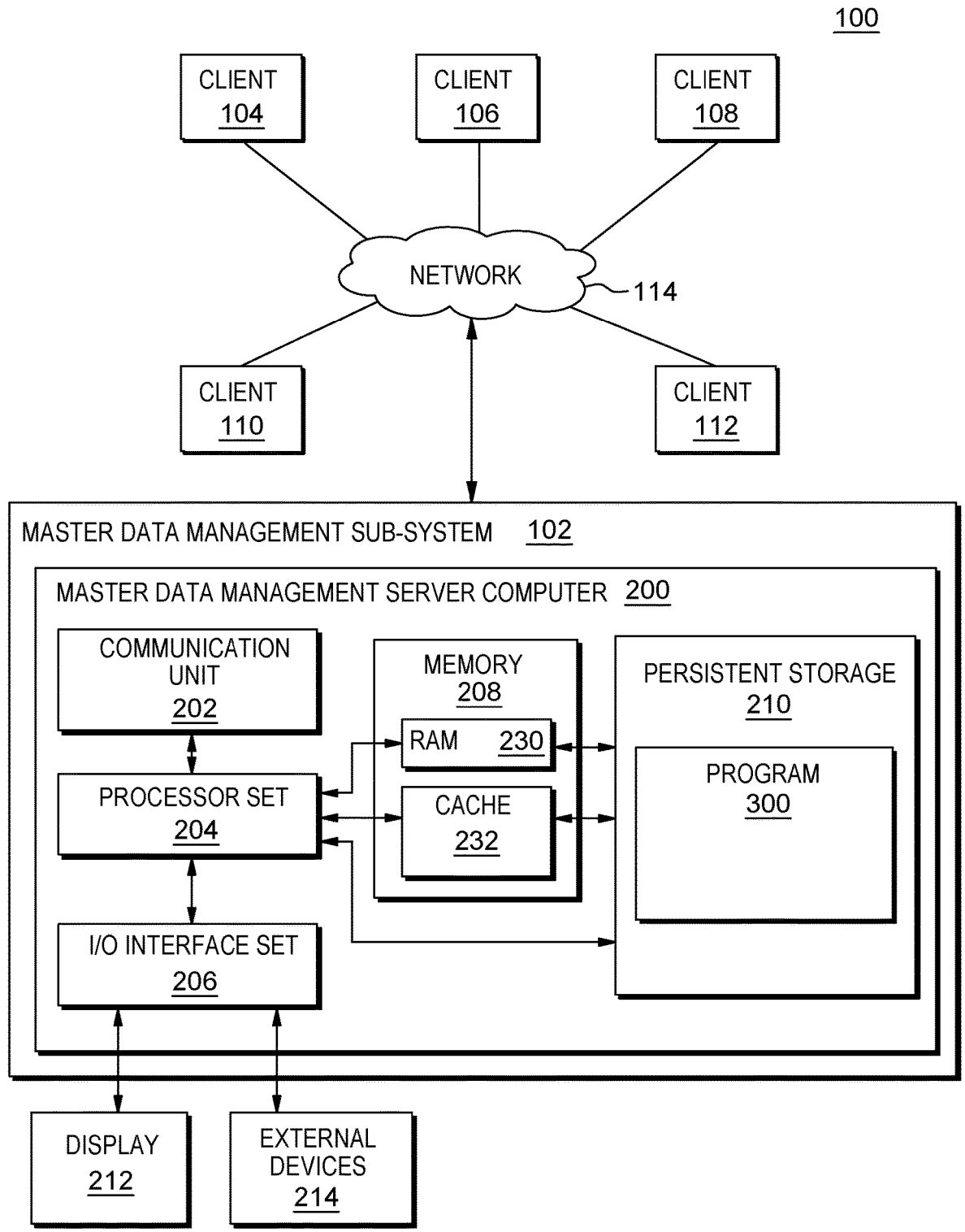
FIG. 1 is a block diagram view of a first embodiment of a system according to the present invention.

This Detailed Description section is divided into the following subsections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product at any possible technical detail level of integration. The computer program product may include a computer readable storage medium (or media) having computer readable program instructions thereon for causing a processor to carry out aspects of the present invention. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

A "storage device" is hereby defined to be anything made or adapted to store computer code in a manner so that the computer code can be accessed by a computer processor. A storage device typically includes a storage medium, which is the material in, or on, which the data of the computer code is stored. A single "storage device" may have: (i) multiple discrete portions that are spaced apart, or distributed (for example, a set of six solid state storage devices respectively located in six laptop computers that collectively store a single computer program); and/or (ii) may use multiple storage media (for example, a set of computer code that is partially stored in as magnetic domains in a computer's non-volatile storage and partially stored in a set of semiconductor switches in the computer's volatile memory). The term "storage medium" should be construed to cover situations where multiple different types of storage media are used.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As shown in FIG. 1, networked computers system 100 is an embodiment of a hardware and software environment for use with various embodiments of the present invention. Networked computers system 100 includes: master data management (MDM) subsystem 102 (sometimes herein referred to, more simply, as subsystem 102); client subsystems 104, 106, 108, 110, 112; and communication network 114. MDM subsystem 102 includes: MDM server computer 200; communication unit 202; processor set 204; input/output (I/O) interface set 206; memory 208; persistent storage 210; display 212; external device(s) 214; random access memory (RAM) 230; cache 232; and program 300.

Subsystem 102 may be a laptop computer, tablet computer, netbook computer, personal computer (PC), a desktop computer, a personal digital assistant (PDA), a smart phone, or any other type of computer (see definition of "computer" in Definitions section, below). Program 300 is a collection of machine readable instructions and/or data that is used to create, manage and control certain software functions that will be discussed in detail, below, in the Example Embodiment subsection of this Detailed Description section.

Subsystem 102 is capable of communicating with other computer subsystems via communication network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client subsystems.

Subsystem 102 is shown as a block diagram with many double arrows. These double arrows (no separate reference numerals) represent a communications fabric, which provides communications between various components of subsystem 102. This communications fabric can be implemented with any architecture designed for passing data and/or control information between processors (such as microprocessors, communications and network processors, etc.), system memory, peripheral devices, and any other hardware components within a computer system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for subsystem 102; and/or (ii) devices external to subsystem 102 may be able to provide memory for subsystem 102. Both memory 208 and persistent storage 210: (i) store data in a manner that is less transient than a signal in transit; and (ii) store data on a tangible medium (such as magnetic or optical domains). In this embodiment, memory 208 is volatile storage, while persistent storage 210 provides nonvolatile storage. The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202 provides for communications with other data processing systems or devices external to subsystem 102. In these examples, communications unit 202 includes one or more network interface cards. Communications unit 202 may provide communications through the use of either or both physical and wireless communications links. Any software modules discussed herein may be downloaded to a persistent storage device (such as persistent storage 210) through a communications unit (such as communications unit 202).

I/O interface set 206 allows for input and output of data with other devices that may be connected locally in data communication with MDM server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. I/O interface set 206 also connects in data communication with display 212. Display 212 is a display device that provides a mechanism to display data to a user and may be, for example, a computer monitor or a smart phone display screen.

In this embodiment, program 300 is stored in persistent storage 210 for access and/or execution by one or more computer processors of processor set 204, usually through one or more memories of memory 208. It will be understood by those of skill in the art that program 300 may be stored in a more highly distributed manner during its run time and/or when it is not running. Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. TWO EXAMPLE EMBODIMENTS

Figure 7:
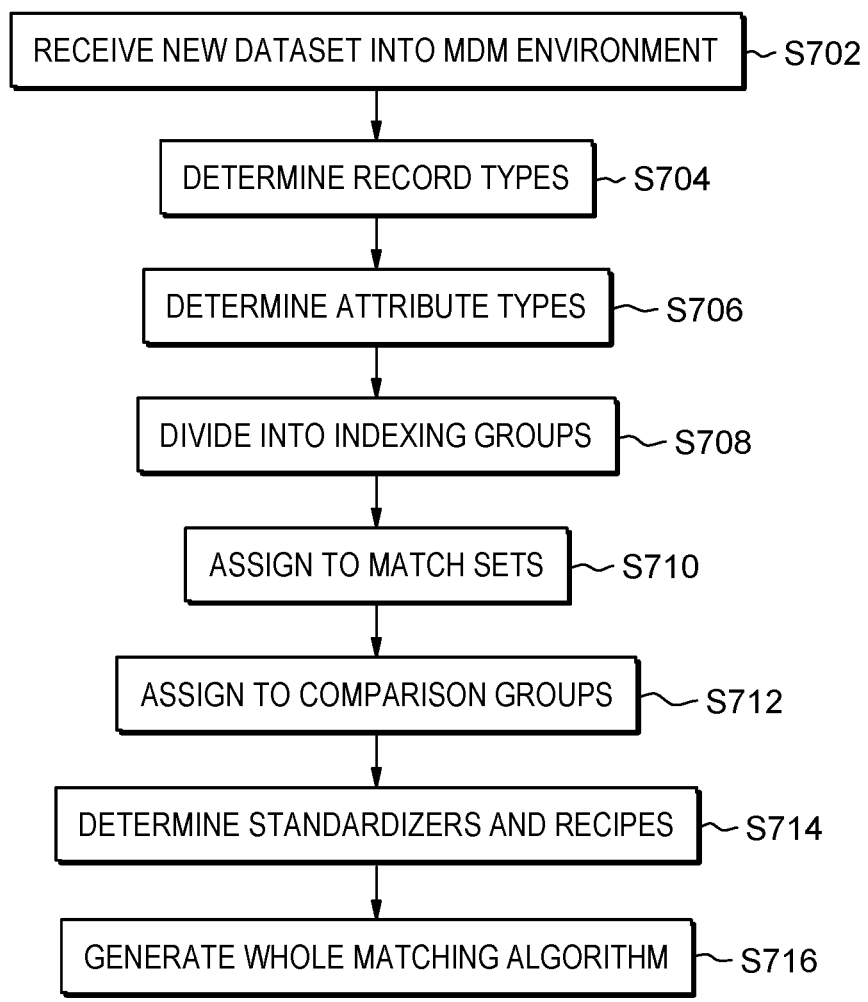
FIG. 7 is a flowchart showing an embodiment of a method performed, at least in part, by the second embodiment system.

FIG. 7 shows a preferred embodiment of a method according to the present invention. This sub-section will set forth a preferred method according to the present invention, in connection with FIG. 7, and then proceed to a more detailed discussion of a simpler embodiment of the invention that is shown in FIGS. 1 to 4.

The method shown in FIG. 7, flowchart 700 includes: receive new dataset into MDM environment block S702; determine record types block S704; determine attribute types block S706; divide into indexing groups block S708; assign to match sets block S710; assign to comparison groups block S712; determine standardizers and recipes block S714; and generate whole matching algorithm block S716.

Figure 2:
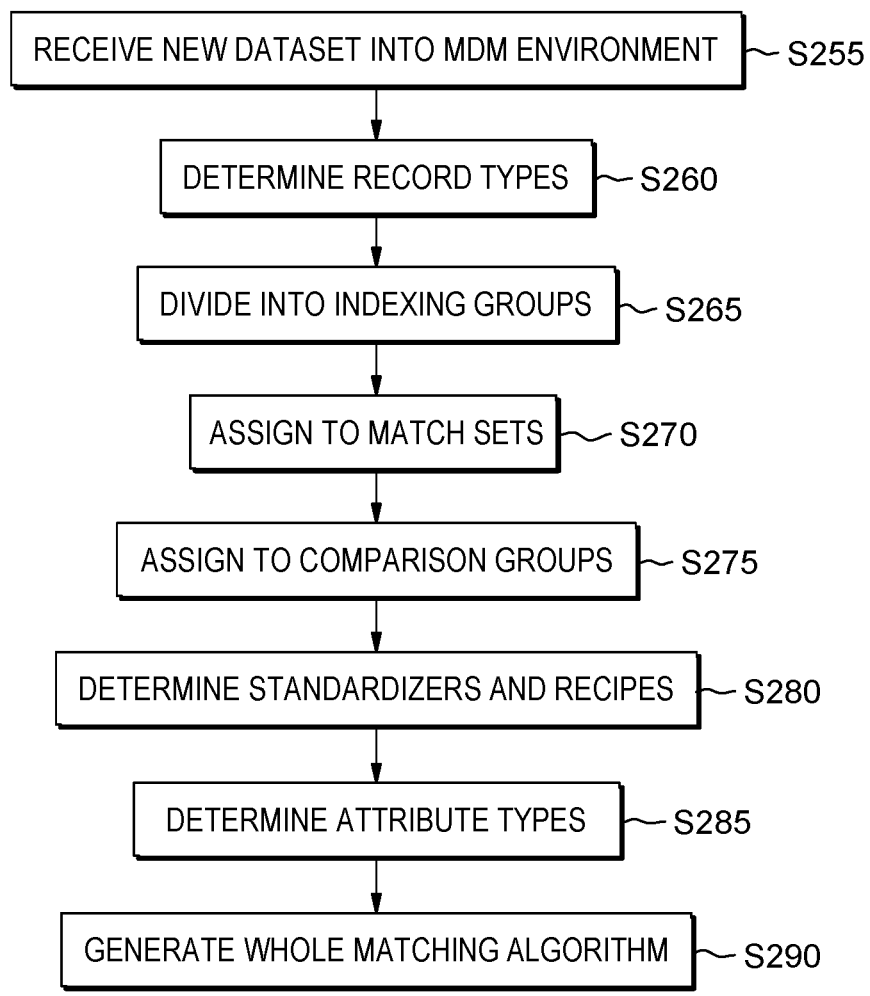
FIG. 2 is a flowchart showing a first embodiment method performed, at least in part, by the first embodiment system.
Figure 3:
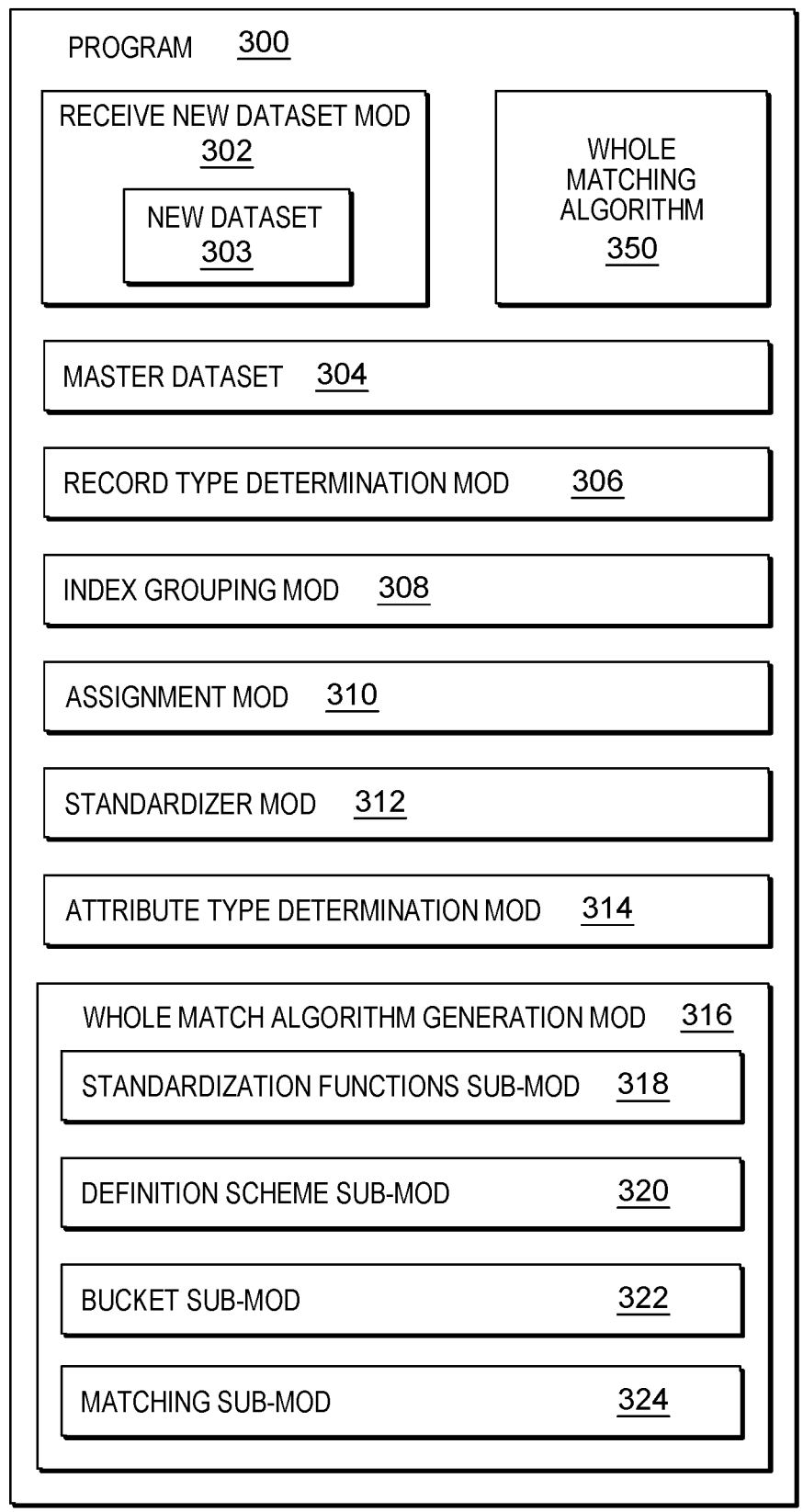
FIG. 3 is a block diagram showing a machine logic (for example, software) portion of the first embodiment system.

As shown in FIG. 1, networked computers system 100 is an environment in which an example method according to the present invention can be performed. As shown in FIG. 2, flowchart 250 shows an example method according to the present invention. As shown in FIG. 3, program 300 (sometimes also referred to as MDM program 300) performs or controls performance of at least some of the method operations of flowchart 250. This method and associated software will now be discussed, over the course of the following paragraphs, with extensive reference to the blocks of FIGS. 1, 2 and 3.

Processing begins at operation S255, where receive new dataset module ("mod") 302 of MDM program 300, receives a new dataset 303 (sometimes referred to as an "additional dataset"). This new dataset includes additional data records that are to be incorporated into a master dataset that includes a plurality of master data records. In this example, master dataset 304 includes data records respectively populated with information relating to individual people living in Anytown, USA. In this example, additional dataset 303 is sent from client sub-system 104 and through network 114 to mod 302. In this example, the new dataset here is a telephone book dataset that corresponds to the telephone book for Anytown USA.

If there are individuals indicated in the new dataset that are not in master dataset 304, then new records will be added to master dataset 304 for the additional individuals discovered through the data included in the new telephone book data set. If there is information (for example, current phone numbers) in the new telephone book data set that is not in the master dataset, then the master dataset will have added the new information that relates to various pre-existing data records. This integration of the new dataset is handled by whole matching algorithm 350. The method of flow chart 250 generates whole matching algorithm 350 in a manner that is tailored to the needs and preferable practices for new dataset 303, as will be explained in connection with the following operations of flowchart 250, and also in the next sub-section of this Detailed description section.

Processing proceeds to operation S260, where record type determination mod 306 determines, for each given additional data record of new dataset 303, a corresponding record type using classifiers (not separately shown) and an internal domain knowledge corpus (not separately shown).

Processing proceeds to operation S265, where index grouping mod 308 divides the additional data records of new dataset 303 into a plurality of indexing groups using the Jaccard coefficient derived from multiple candidate lists (not separately shown).

Processing proceeds to operation S270, where, for each given additional data record of new dataset 303, assignment mod 310 assigns the given additional data record to a match set based on completeness and similarity of natures of attributes of the given additional data record. An example list of different "record types" that might be used in a typical example include the following: person, organization, and product. In some embodiments, assignment mod 310 will also assign entity types. An example list of different "entity types" that might be used in a typical example may include the following: person entity, household entity for person record type, and organization entity for organization record types.

Processing proceeds to operation S275, where for each given additional data record of the plurality of additional data records, assigning the given additional data record to a comparison group based on completeness and similarity of natures of attributes of the given additional data record.

Processing proceeds to operation S280, where standardizer mod 312: (i) determines a set of standardizers; and (ii) determines recipes for each standardizer of the set of standardizers.

Processing proceeds to operation S285, where attribute type determination mod 314: (i) determines an attribute type for each column (or "field") in the additional data records of new dataset 303; and (ii) creates syntax to specify the plurality of attribute types that is compatible with the MDM environment. An example list of different "attribute types" that might be used in a typical example may include: name, address, phone, identifiers, email, and date of birth. In order to be understandable in an MDM environment it should be kept in mind that there are no specific protocols, ontologies, and/or computer languages involved. There is a data model deployed by a customer as per its data requirements. Classified columns of the incoming data record are mapped to the attributes present in data model. This is what is meant, for purposes of this document, by "compatible with the MDM environment."

Processing proceeds to operation S290, where whole match algorithm generation mod 316 generates whole matching algorithm 316. In this example, operation S290 includes six (6) sub-operations that will be respectively discussed in the following six (6) paragraphs.

Standardization functions sub-mod 318 generates standardization functions 402 (see FIG. 4) for the whole matching algorithm. The standardizer set would be the same as the match set because only the data which is to be matched needs to be standardized. Once every column has been mapped to internal defined types, it is then known what standardization recipes, bucket recipes, and compare recipes can be applied to each column based on an internal (template), and ever-increasing metadata. For non-template attributes, generic functions would be applied based on the data type of that attribute.

Definition scheme sub-mod 320 generates a definition scheme 404 (see FIG. 4) for entity types of the whole matching algorithm. For every record type, there would be an exhaustive list of possible entity types (based on what is seen in typical use cases). For example, for a person, there would be a person (individual) entity and a household entity. However, a household entity necessitates having an address and landline phone number in the dataset. If these are not present, only a person entity construct would be generated, otherwise both a person and a household entity construct would be generated.

Bucket sub-mod 322 generates bucketing functions 406 (see FIG. 4) used for hash creation during indexing. The bucket set is the same as a match set except for the less-unique column. The uniqueness of every attribute in the match set would be calculated. Columns which have only a limited set of values would not be considered for bucketing.

Bucket sub-mod 322 generates multiple bucket groups 408 (see FIG. 4) based on optimal combinations of different attributes. Determination of bucket groups will now be discussed. To determine a bucket group, first create buckets individually on each attribute in the bucket set. Then run a derive job which creates standardized data as well as bucket hashes for each record in the data, based on the above created buckets. Get the bucket distribution for each bucket, then filter the ones which are having good distribution, for example, identifiers. Those buckets are called flat bucket groups. For the rest of the buckets, think of all pair-wise combinations to form bucket groups. For each bucket (individual bucket group), get all its bucket hashes and respective candidates list, for example, list A. On all such "n" lists, perform the below Jaccard index calculation for each pair of lists and select all those pairs for which the Jaccard index value (J) is greater than a configured threshold: J(A, B)=size(A intersect B)/size(A union B). Buckets corresponding to each selected pair will form the bucket group.

Matching sub-mod generates a set of matching functions 410 (see FIG. 4) for the whole matching algorithm. Once every column has been mapped to internal defined types, it is then known what compare recipes can be applied to each column based on internal (template), ever-increasing metadata. Compare recipes are nothing but the machine definition of matching functions.

Figure 4:
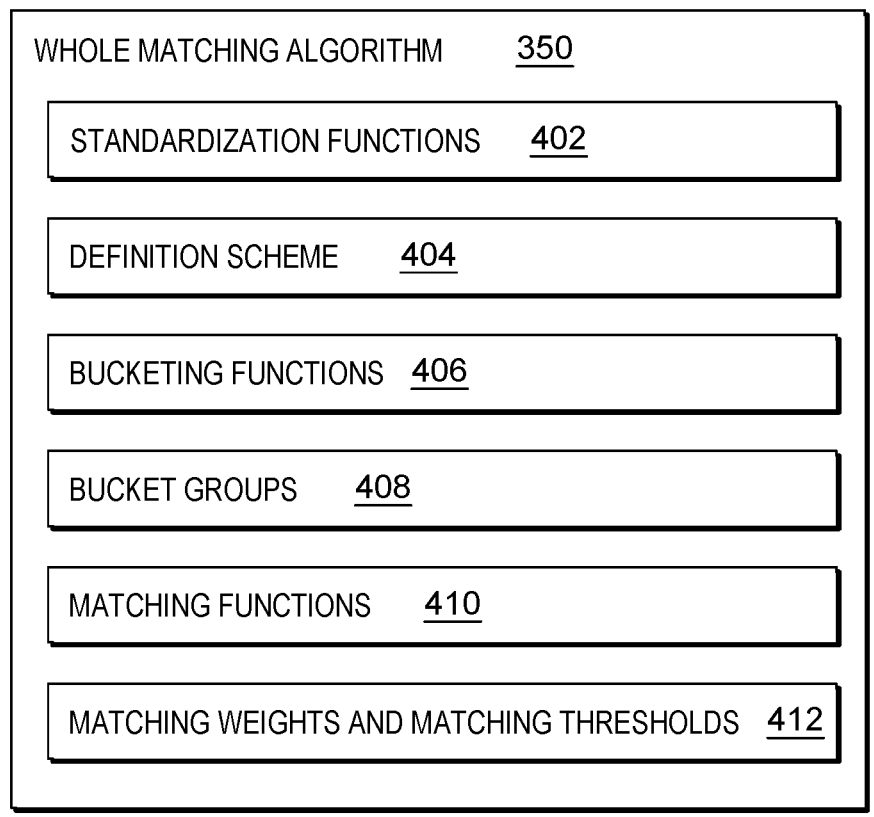
FIG. 4 is a screenshot view generated by the first embodiment system.

Matching sub-mod 324 determines a set of matching weight values (sometimes herein more simply referred to as "matching weights") and a set of matching threshold values (sometimes herein more simply referred to as matching thresholds"—see matching weights and matching thresholds block 412 of FIG. 4) for the whole matching algorithm. There are different default weights for different matching attributes (name, gender, date of birth, etc.). During the algorithm generation, default weights would be used for all the attributes. Similarly, there is a default (0.50) threshold value which is used as a matching threshold. Later, users perform sample pairs analysis to test the matching outcomes, where there is an auto learning module which optimizes these thresholds and weights as per the outcome of sample pair analysis (supervised learning).

III. FURTHER COMMENTS AND/OR EMBODIMENTS

Some embodiments of the present invention recognize the following facts, potential problems and/or potential areas for improvement with respect to the current state of the art: (i) MDM based solutions work with enterprise data, perform indexing, matching, and linking of data from different sources (for example, customer relationship management, credit reporting, and internet web portals) creating a 360 degree view of the customers data; (ii) matching record pair data requires comparing different record attributes (for example, name, address, date of birth, and identifier) from each pair of records to determine if they match and should subsequently be linked, based on a series of mathematically derived statistical probabilities and complex weight tables; (iii) attribute comparison functions check for a variety of matching conditions such as exact, edit distance, contiguous sequence of "n" items, phonetic, or partial matching where scores are generated based on the outcome of these comparisons, and sub scores from each attribute, are combined based on statistically determined relative weights; and/or (iv) using statistically defined thresholds within the system, pairs of records are considered as matched, unmatched, or indeterminant and sent to clerical review.

This paragraph is a problem statement. Some embodiments of the present invention recognize the following facts, potential problems and/or potential areas for improvement with respect to the current state of the art: (i) this is an era of data analytics where every analytics organization is moving towards a data-first approach; (ii) data is supplied, to the analytics engine or information analyzer, and is expected to work automatically to produce results; (iii) MDM is one such product in the market which helps customers to match and link the records from different data sources and keeps a "golden copy" of the records into which the data is organized, but MDM relies on its matching algorithm heavily to do its processing; (iv) customers currently spend a lot of time configuring their algorithms through workbench or web UIs (user interfaces) to get desired results; and/or (v) domain expertise is typically required to configure MDM matching algorithms.

Figure 5:
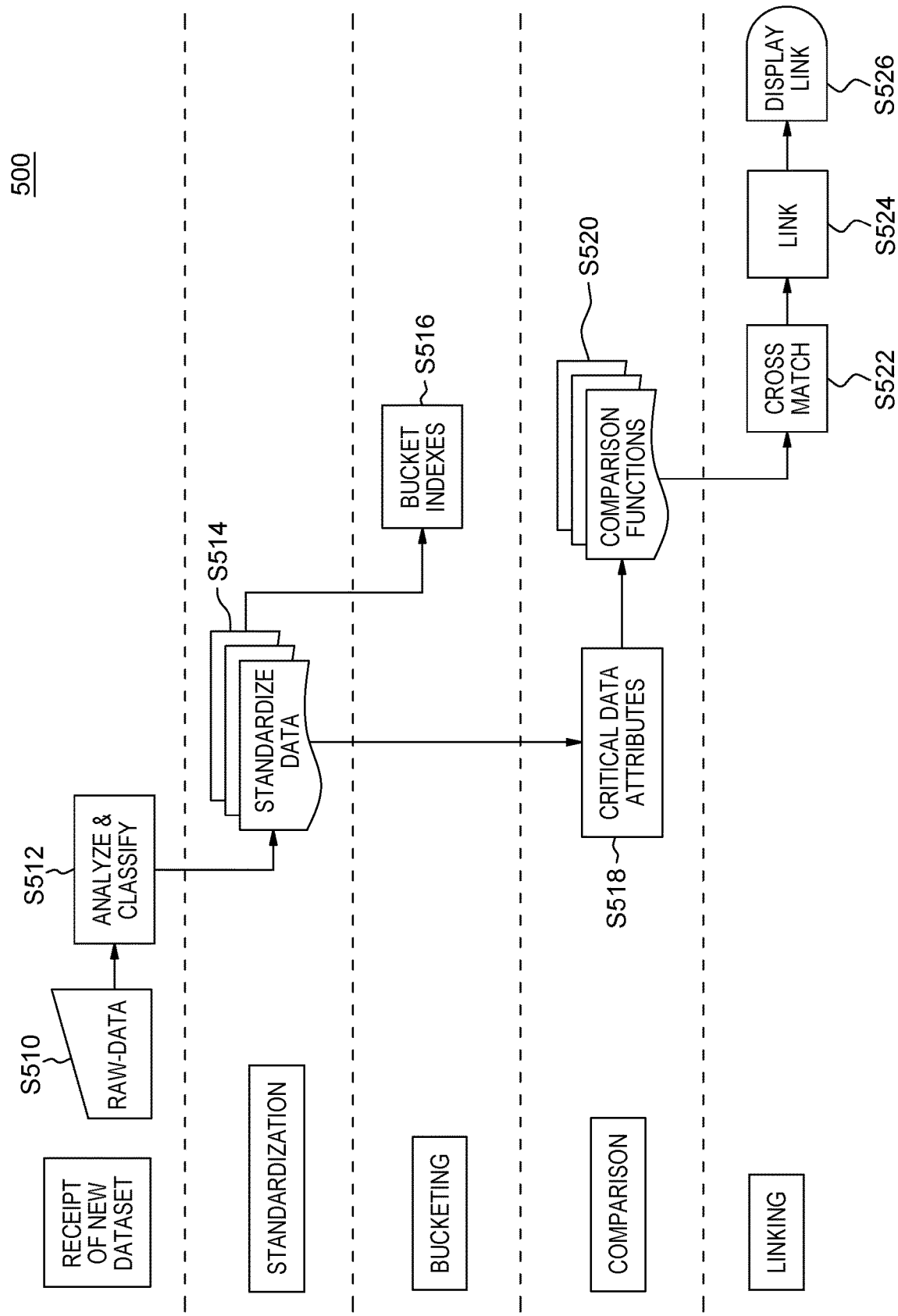
FIG. 5 is a flow diagram according to an embodiment of the present invention.

As shown in FIG. 5, diagram 500 is a flow diagram of an embodiment of a matching and linking process according to the present invention. More specifically, the process of diagram 500 includes five (5) phases: receipt of new dataset, standardization, bucketing, comparison and linking. The operations of the process (with process flow as indicated by arrows in diagram 500) are as follows: S510; S512; S514; S516; S518; S520; S522; S524; and S526.

Figure 6:
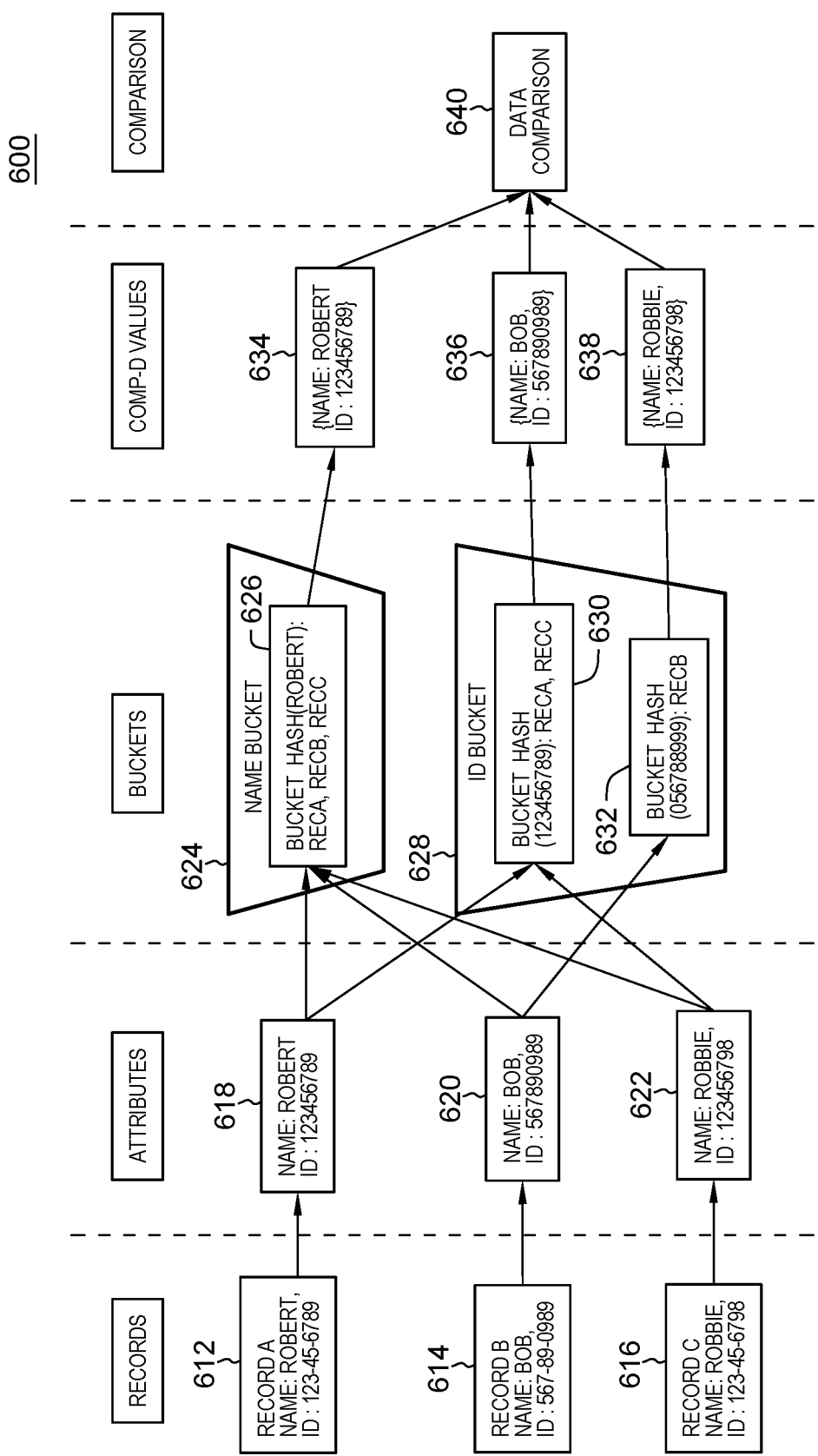
FIG. 6 is a diagram showing sample flow according to an embodiment of the present invention.

As shown in FIG. 6, sample flow view diagram 600 includes five (5) flow phases as follows: records phase; attributes phase; buckets phase; comp-D values phase and comparison phase. As further shown in FIG. 6, the sample flow of diagram 600 includes the following blocks (with flow among and between the blocks as shown by arrows in FIG. 6): block 612; block 614; block 616; block 618; block 620; block 622; block 624; block 626; block 628; block 630; block 632; block 634; block 636; block 638; and block S640.

The method shown in FIG. 7, flowchart 700 includes: receive new dataset into MDM environment block S702; determine record types block S704; determine attribute types block S706; divide into indexing groups block S708; assign to match sets block S710; assign to comparison groups block S712; determine standardizers and recipes block S714; and generate whole matching algorithm block S716.

A method to generate a whole matching algorithm for use in MDM (master data management) with respect to a supplied dataset includes the following operations (not necessarily in the following order): (i) determination of record type and entity types using classifiers and internal domain knowledge corpus; (ii) determination of indexing groups using the Jaccard coefficient of candidate lists; (iii) determination of match set and comparison groups based on completeness and similarity of natures of attributes; (iv) determination of list of standardizers and their recipes; and (v) determination of MDM understandable attribute types for each column in the dataset.

Some embodiments of the present invention may include one, or more, of the following operations, features, characteristics and/or advantages: (i) includes auto generation of the full matching algorithm to start the matching process; (ii) uses the "data first" perspective; (iii) customers can use their own data; (iv) there is no need for a MDM domain expert to manually create the algorithm; and/or (v) everything related to the matching algorithm would be generated automatically using sophisticated methods.

Some features of the algorithm in MDM will now be discussed: (i) an MDM algorithm consists of various components/structs which are required for the matching engine to perform different tasks in the overall matching and linking process; (ii) for a given record type (for example, person, and organization), an algorithm consists of standardizers and entity types; (iii) standardizers are mainly used for data cleansing, parsing and standardization; (iv) different entity types, (for example, person entity, and household entity) define the strategies as to how the data should be linked; (v) every entity type consists of buckets, bucket groups, comparators, and comparison groups along with matching weights and thresholds; and/or (vi) buckets and bucket groups are mainly used for indexing of the data where comparators and comparison groups define and control how different attributes should be matched and linked.

Some embodiments of the present invention may include one, or more, of the following operations, features, characteristics and/or advantages: (i) includes determination of the record type from the supplied data set; (ii) includes classification of every column using trained classifier(s); (iii) includes mapping of each classified column to MDM understandable columns/fields; (iv) includes determination of all possible and meaningful entity types for the identified record type; (v) includes generation of a match set based on completeness, uniqueness, and importance of different columns; (vi) includes a produce list of standardizers and their recipes based on a match set and internally available constructs of different standardizers; (vii) includes a produce list of comparators and their recipes based on a match set and their internal constructs; (viii) can determine comparison groups using similarity of nature of attributes in a match set; (ix) includes generation of buckets from the match set; and/or (x) includes generation of bucket groups based on Jaccard similarity index of suspected candidates.

Some embodiments of the present invention may include one, or more, of the following operations, features, characteristics and/or advantages: (i) the dataset (csv (comma-separated values) file) can have any number of columns in it where every row represents one record; (ii) the dataset is passed to a classifier, such as a cloud-based enterprise metadata repository, which comes back with each column classified with a certain confidence percentage; (iii) based on classification of all the columns, the record type would be determined; (iv) each classified column is passed to an NLU (natural-language understanding) based internal knowledge base which maps/categorizes these classified columns to one of MDM's internal defined types; and/or (v) based on the record type and using available MDM understandable attributes in the data and an exhaustive list of all possible and meaningful entity types, entity types for the supplied dataset can be determined.

Some embodiments of the present invention may include one, or more, of the following operations, features, characteristics and/or advantages: (i) once every column has been mapped to internal defined types, it is then known what standardization recipes, bucket recipes, and compare recipes can be applied to each column based on internal (template), ever-increasing metadata, where for non-template attributes, there would be generic functions applied based on the data type of that attribute; (ii) the dataset maintains which columns should be used for matching, standardization and bucketing; (iii) maintains what dataset columns should be clubbed together to form a comparison group; (iv) maintains which columns should be used for creating a bucketing group, where this is determined through further analysis of columns data; and/or (v) can generate the whole algorithm for the supplied dataset.

Determination of a match set, standardizer set, buckets, and comparison groups will now be discussed. Based on the completeness and internally defined importance, determine the match set. Here the completeness of columns/fields and the completeness of an attribute would be determined. Using the completeness and importance of an attribute, its matching strength would be determined. All the attributes having matching strength above a certain threshold and would be considered as a match set. Attributes of a similar nature (business meaning) will form the comparison groups. The standardizer set would be the same as the match set because only the data which is to be matched needs to be standardized. The bucket set is the same as a match set except for the less-unique column. The uniqueness of every attribute in the match set would be calculated. Columns which have only a limited set of values would not be considered for bucketing.

Determination of bucket groups will now be discussed. To determine a bucket group, first create buckets individually on each attribute in the bucket set. Then run a derive job which creates standardized data as well as bucket hashes for each record in the data, based on the above created buckets. Get the bucket distribution for each bucket, then filter the ones which are having good distribution, for example, identifiers. Those buckets are called flat bucket groups. For the rest of the buckets, think of all pair-wise combinations to form bucket groups. For each bucket (individual bucket group), get all its bucket hashes and respective candidates list, for example, list A. On all such "n" lists, perform the below Jaccard index calculation for each pair of lists and select all those pairs for which the Jaccard index value (J) is greater than a configured threshold: $J(A, B)=size(A\ intersect\ B)/size(A\ union\ B)$. Buckets corresponding to each selected pair will form the bucket group.

An example showing determination of bucket groups, according to the present invention will now be discussed.
Bucket1: Name Bucket2: Zip Bucket3: email
After performing the derive job operation, the bucket based analysis is done where:
Bucket1 candidates list: [1, 34, 63, 78, 96]<---record numbers
Bucket2 candidates list: [1, 30, 63, 78, 96, 103, 192]
Bucket3 candidates list: [5, 24, 40, 96, 142]

J(bucket1, bucket2)=4/8=0.5
J(bucket2, bucket3)=1/11=0.09
J(bucket1, bucket3)=1/9=0.11
Only bucket1 and bucket2 would form a bucket group.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method (CIM) for use in a master data management (MDM) environment including a plurality of master data records stored in a set of storage device(s), the CIM comprising:
   receiving a plurality of additional records that include data that is to be incorporated into the plurality of master data records;
   automatically generating a full matching algorithm to determine whether subject matter of data of each additional record matches any of the records of the plurality of master data records, with the full matching algorithm including code for performing the following operations:
      determining a record type for the additional records using classifiers and an internal domain knowledge corpus,
      calculating a Jaccard coefficient for a plurality of candidate lists,
      assigning the each additional data record to a match set based on completeness and similarity of natures of attributes of the additional record, and
      for each given additional record of the plurality of additional records, assigning the given additional record to a comparison group based on completeness and similarity of natures of attributes of the given additional data record;
   applying the full matching algorithm to determine whether each additional record matches an existing master data record; and
   for additional data records that match an existing master data record, merging the matching additional data record with its matching master data record in the set of storage device(s) to generate an updated version of the matching master data record that includes data from the matching additional record.

2. The CIM of claim 1 the full matching algorithm includes code for performing the following further operations:
   determining a plurality of standardizers; and
   determining recipes for the plurality of standardizers.

3. The CIM of claim 2 the full matching algorithm includes code for performing the following further operations:
   determining of a plurality of attribute types for each column in the additional records of the plurality of additional records; and
   creating syntax to specify the plurality of attribute types that is compatible with the MDM environment.

4. The CIM of claim 1 the full matching algorithm includes code for performing the following further operations:
   for each given additional record of the plurality of additional records, determining, an entity type using classifiers and an internal domain knowledge corpus.

5. A computer program product (CPP) for use in a master data management (MDM) environment including a plurality of master data records stored in a set of storage device(s), the CIM comprising:
   a set of storage device(s); and
   computer code stored collectively in the set of storage device(s), with the computer code including data and instructions to cause a processor(s) set to perform at least the following operations:
      receiving a plurality of additional records that include data that is to be incorporated into the plurality of master data records,
      automatically generating a full matching algorithm to determine whether subject matter of data of each additional record matches any of the records of the plurality of master data records, with the full matching algorithm including code for performing the following operations,
         determining a record type for the additional records using classifiers and an internal domain knowledge corpus,
         calculating a Jaccard coefficient for a plurality of candidate lists,
         assigning the each additional data record to a match set based on completeness and similarity of natures of attributes of the additional record, and
         for each given additional record of the plurality of additional records, assigning the given additional record to a comparison group based on completeness and similarity of natures of attributes of the given additional data record, and
      applying the full matching algorithm to determine whether each additional record matches an existing master data record, and
      for additional data records that match an existing master data record, merging the matching additional data record with its matching master data record in the set of storage device(s) to generate an updated version of the matching master data record that includes data from the matching additional record.

6. The CPP of claim 5 the full matching algorithm includes code for performing the following further operations:
   determining a plurality of standardizers; and
   determining recipes for the plurality of standardizers.

7. The CPP of claim 6 the full matching algorithm includes code for performing the following further operations:
   determining of a plurality of attribute types for each column in the additional records of the plurality of additional records; and
   creating syntax to specify the plurality of attribute types that is compatible with the MDM environment.

8. The CPP of claim 5 the full matching algorithm includes code for performing the following further operations:
   for each given additional record of the plurality of additional records, determining, an entity type using classifiers and an internal domain knowledge corpus.

9. A computer system (CS) comprising:
   a processor(s) set;
   a set of storage device(s); and
   computer code stored collectively in the set of storage device(s), with the computer code including data and instructions to cause the processor(s) set to perform at least the following operations:
   receiving a plurality of additional records that include data that is to be incorporated into the plurality of master data records,
   automatically generating a full matching algorithm to determine whether subject matter of data of each additional record matches any of the records of the plurality of master data records, with the full matching algorithm including code for performing the following operations,
   determining a record type for the additional records using classifiers and an internal domain knowledge corpus,
   calculating a Jaccard coefficient for a plurality of candidate lists,
   assigning the each additional data record to a match set based on completeness and similarity of natures of attributes of the additional record, and
   for each given additional record of the plurality of additional records, assigning the given additional record to a comparison group based on completeness and similarity of natures of attributes of the given additional data record, and
   applying the full matching algorithm to determine whether each additional record matches an existing master data record, and
   for additional data records that match an existing master data record, merging the matching additional data record with its matching master data record in the set of storage device(s) to generate an updated version of the matching master data record that includes data from the matching additional record.

10. The CS of claim 9 the full matching algorithm includes code for performing the following further operations:
    determining a plurality of standardizers; and
    determining recipes for the plurality of standardizers.

11. The CS of claim 10 the full matching algorithm includes code for performing the following further operations:
    determining of a plurality of attribute types for each column in the additional records of the plurality of additional records; and
    creating syntax to specify the plurality of attribute types that is compatible with the MDM environment.

12. The CS of claim 9 the full matching algorithm includes code for performing the following further operations:
    for each given additional record of the plurality of additional records, determining, an entity type using classifiers and an internal domain knowledge corpus.

* * * * *